ns, 1961

2,975,148

EPOXY-RESIN β-MONOALLYL ITACONATE-CONTAINING COMPOSITIONS, THEIR PREPARATION AND ARTICLES CONTAINING SAME

Russell A. Skiff, Whittier, Calif., assignor to General Electric Company, a corporation of New York No Drawing. Filed Jan. 20, 1958, Ser. No. 709,737

10 Claims. (Cl. 260—23)

This invention relates to new and useful resin compositions. More particularly, the invention relates to resin compositions of the ethoxyline type having desirable physical, chemical and electrical properties, including favorable resistance to high temperature conditions.

Epoxy, epoxide or ethoxyline resins, as they are variously called, are well known in the art. Generally, such epoxy resins comprise a polyether derivative of a polyhydric organic compound, said derivative containing 1,2-epoxy groups, said compound being selected from the class consisting of polyhydric alcohols and phenols containing at least two phenolic hydroxy groups. For example, U.S. Patent 2,324,483 to Castan discloses epoxy resin compositions comprising the reaction product of phenols having at least two phenolic hydroxy groups and an epihalogenohydrin, such as epichlorohydrin, the product having at least two epoxy groups and being cured to a thermoset infusible mass by the use of a carboxylic or polybasic acid or acid anhydride, such as phthalic anhydride.

While epoxy resins cured with polybasic carboxylic acids or anhydrides provide very useful materials for many uses, these resins so cured have certain inherent disadvantages, among which is a relatively short pot life. A further disadvantage of epoxy resins cured in this manner lies in the fact that when thin films of the resin and curing agent are heated at the usual curing temperatures of from about 150° C. to 200° C., an excessive loss of curing agent often results, producing a final material of variable composition and poor physical properties. Such resins cured in the above manner are also generally characterized by relatively poor heat resistance at temperatures of the order of 200° C. and higher. The use of organic nitrogen base or amine type materials to cure epoxy resins is also well known, as set forth for example in Patent 2,444,333, such materials often giving a rapid cure at room temperature. Generally, however, the pot life of amine-cured epoxy resins is relatively short and their high temperature characteristics are often poor. The amine type curing agents are also characterized by their toxicity, necessitating the adoption of special precautions for protection of personnel when they are used.

A principal object of the present invention is to provide compositions containing ethoxyline resins which are characterized among other things by their favorably long pot life and by their high temperature resistance.

Briefly stated, the invention comprises resinous compositions containing epoxy resins and having as a curing agent, hardening agent or constituent therefor β-monoallyl itaconate.

The ethoxyline resins used in conjunction with my invention are, as pointed out above, well known in the art. They are described in Castan United States Patent Nos. 2,324,483 and 2,444,333, British Patent No. 518,057, and British Patent No. 579,698. Generally, the ethoxyline resins described therein are the reaction product of an epihalogenohydrin such as epichlorohydrin and a phenol having at least two phenolic hydroxy groups such as bis-(4-hydroxy phenyl)-2,2-propane. United States Patent Nos. 2,494,295, 2,500,600 and 2,511,913 describe further ethoxyline resins which can be used in conjunction with my invention. The above patents are hereby incorporated by reference in this application. The ethoxyline resins used herein have more than one epoxy group per molecule. They can be prepared by reacting a polyhydroxy alcohol or phenol such as hydroquinone, resorcinol, glycerine and condensation products of phenols with ketones, for example, bis-(4-hydroxy phenyl)-2,2-propane with epichlorohydrin. The reaction of epichlorohydrin with bis-(4-hydroxy phenyl)-2,2-propane is as follows:

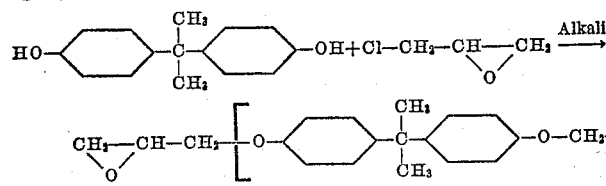

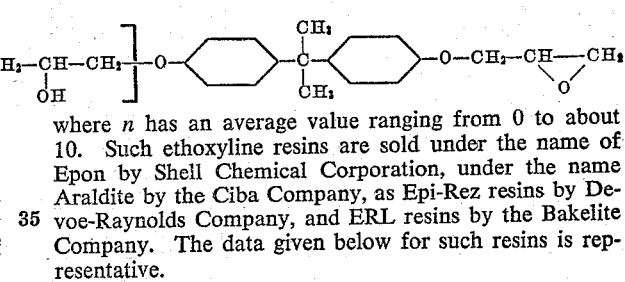

where $n$ has an average value ranging from 0 to about 10. Such ethoxyline resins are sold under the name of Epon by Shell Chemical Corporation, under the name Araldite by the Ciba Company, as Epi-Rez resins by Devoe-Raynolds Company, and ERL resins by the Bakelite Company. The data given below for such resins is representative.

TABLE I

| Epoxy Resin | Epoxide Equivalent | M.P., ° C. |
|---|---|---|
| Epon 828 | 192 | 9 |
| Epon 834 | 225–290 | 20–28 |
| Epon 1001 | 450–425 | 64–76 |
| Epon 1004 | 905–985 | 97–103 |
| Epon 1007 | 1,600–1,900 | 127–133 |
| Epon 1009 | 2,400–4,000 | 145–155 |
| Epon 1062 | 140–165 | Liquid |
| Epon 1064 | 300–375 | 40–45 |
| Araldite 6010 | 192 | Liquid |
| Araldite 6020 | 200–205 | Liquid |
| ERL 2774 | 175–200 | Liquid |
| Epi-Rez 510 | 175–200 | Liquid |

The β-monoallyl itaconate used in connection with the present invention has the chemical formula:

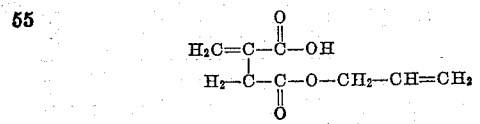

and is commercially available. The relatively low melting point of the material of about 38° C. to 39° C. permits it to be readily combined with epoxy type resins. Large amounts of β-monoallyl itaconate may be added to epoxy resins and the temperature lowered to as much as 20° C. without precipitation of the additive. Hence, the mixture can be prepared effectively at room temperature in connection with the invention.

There were mixed together β-monoallyl itaconate with Epon 828 in the varying proportions shown in Table II.

TABLE II

| Example | Epon 828 | β-monoallyl itaconate (parts by weight) |
|---|---|---|
| 1 | 100 | 28.5 |
| 2 | 100 | 30.7 |
| 3 | 100 | 72.5 |

TABLE V

| Example | Epon 828 (parts by weight) | Epon 1310 (PBW) | β-monoallyl itaconate (parts by weight) | Gel time (hrs.) | Cure time (hrs.) | Properties |
|---|---|---|---|---|---|---|
| 7 | 100 | | 30 | 4 (150° C.) / 1 (200° C.) | 24 (150° C.) / 6 (200° C.) | Semi-flexible. / Slightly semi-flexible. |
| 8 | 50 | 50 | 35 | 3 (150° C.) / 1 (200° C.) | 24 (150° C.) / 4 (200° C.) | Semi-flexible. / Slightly semi-flexible. |
| 9 | 100 | | 100 | 4 (150° C.) / 1 (200° C.) | 24 (150° C.) / 2½ (200° C.) | Semi-flexible. / Hard-somewhat brittle. | and the mixtures heated for about 24 hours at 200° C. After this period of time, the samples had polymerized to hard, tough, thermoset materials which were very clear and a light yellow in color. When the materials were heated for 90 days at 200° C., the samples while dark in color were not cracked or distorted, and the materials were in addition very hard and tough. This is in striking contrast to ethoxyline resins cured with polybasic acids, anhydrides, or amine type curing agents, which generally not only darken in color but become very soft or crack and crumble very readily.

Examples 1 and 3 were tested for a weight loss at 200° C. for varying periods of time with the results noted in Table III below.

TABLE III

| Sample | Weight at start, gm. | Percent Weight Loss at 200° C. | | | | |
|---|---|---|---|---|---|---|
| | | 24 hr. | 792 hr. | 1,200 hr. | 1,776 hr. | 2,160 hr. |
| 1 | 96.42 | .45 | | 3.45 | | 5.32 |
| 3 | 67.60 | .50 | 5.03 | 6.3 | 6.7 | |

Shown in Table IV below is the weight loss after 500 hours at 200° C. of various epoxy resins as shown, using ordinary well-known curing agents as set forth in the table.

TABLE IV

| Example | Ethoxyline Resin | Curing Agent | Resin Curing Agent | Percent Weight Loss at 200° C., 500 hrs. |
|---|---|---|---|---|
| 4 | Araldite 6020 | Hexachlorendo - methylenetetra - hydrophthalic anhydride. | 1/1 | 12.9 |
| 5 | Epon 828 | Benzyldimethylamine | 10/1 | 7.2 |
| 6 | Araldite 6020 | Phthalic anhydride | 10/3 | 5.2 |

All of the samples in Table IV above were completely black after 500 hours at 200° C. In addition, the material of Example 4 was badly distorted and the material of Example 6 was cracked and crazed.

Comparison of Tables III and IV above will at once make apparent the fact that the materials of the present invention are characterized by a desirably low percent weight loss after heat aging at relatively high temperatures for long periods of time. It will also be apparent from Table II that amounts of β-monoallyl itaconate and epoxy resin in the ratio of the order of about 30 parts of the additive to about 100 parts of the epoxy resin are to be preferred to the higher ratios of the β-monoallyl itaconate such as in Example 3, which it will be seen from Table III has a higher weight loss at elevated temperatures. However, when increasing weight loss can be tolerated, larger amounts of β-monoallyl itaconate can be used.

Shown in Table V below are the gel time, cure time and physical properties at the temperatures shown for the proportions of epoxy and β-monoallyl itaconate set forth therein.

Epon 1310 ethoxyline resin is manufactured by the Shell Development Company and is the polyglycidyl ether of 1,1',2,2'-tetrabis-(hydroxyphenyl)ethane.

Mixtures of ethoxyline resins with β-monoallyl itaconate it has been found, even in the partially reacted state, can be stored at room temperatures for long periods of time of up to at least six months. At the end of six months, the mixtures are still found to be soluble and fusible. This is in direct contrast to resins prepared with ethoxyline resin using polybasic organic acid anhydrides alone as a curing agent, which generally are substantially insoluble and infusible in less than about 31 days at room temperature, and, from a practical point of view, are unusable in less than about 14 days.

While the mixtures of ethoxyline resin and β-monoallyl itaconate are self-curing in the presence of heat, it is quite apparent that the presence of curing agents for both the ethoxyline or epoxy resin and the β-monoallyl itaconate is not precluded. For example, acceleration of the cure of the epoxy resin may be obtained by employing acidic curing agents generally known in the arts, such as phthalic anhydride, oxalic acid, maleic acid, and hexachloroendomethylenetetrahydrophthalic anhydride, among others which are well known to those skilled in the art.

Example 10

There was prepared 100 parts of Epon 828 with 35 parts of β-monoallyl itaconate and 3 parts of pyromellitic dianhydride. After heat treating for 50 days at 250° C., the solidified resin was black in color but otherwise had a good surface appearance with no cracking or distortion whatsoever. The physical strength was very high.

Example 11

There was mixed together 100 parts of Epon 828, 35 parts of β-monoallyl itaconate and 3 parts of boron oxide. After heating for 50 days at 250° C., the hardened resin was black on the surface but otherwise had an excellent appearance. There was no cracking or distortion of the specimen and its physical strength and arc resistance qualities were excellent.

The ethoxyline-β-monoallyl itaconate compositions of the invention may be employed with various well-known fillers which are well known in the art.

Example 12

There were mixed together 100 parts of Epon 828, 35 parts of β-monoallyl itaconate, together with 100 parts by weight of finely divided talc. This mixture when cured for 50 days at 250° C. had a rather dark brown but otherwise good appearance. There was no cracking or distortion of the specimen, and its physical strength was excellent. When tested according to ASTM methods, its arc resistance for various samples ranged from about 65 to 198 seconds.

Just as hardening agents may be employed in the compositions of this invention as accelerators for the epoxy resin component, vinyl polymerization accelerators for the β-monoallyl itaconate can also be used. However, since the rate of cure of the β-monoallyl itaconate in its reaction with the ethoxyline resin is quite rapid, there is really no need for such additional curing agents or curing accelerators, although they may be employed. Among those vinyl polymerization accelerators which are useful in this respect are tertiary butyl perbenzoate, tertiary butyl hydroperoxide, cyclohexyl hydroperoxide, benzoyl peroxide, etc. Preferably the vinyl polymerization catalyst, if used, is within the range of from about 0.02 to 2.5% by weight of the weight of the β-monoallyl itaconate.

The epoxy resin-β-monoallyl itaconate resin compositions of this invention are very useful when combined with vinyl type polymers or polyesters.

Example 13

There were mixed together 35 parts by weight of Epon 828, 10 parts β-monoallyl itaconate, and 25.3 parts of diallyl phthalate, along with .27 part of tertiary butyl perbenzoate. When this mixture was heated for approximately 70 hours at 150° C., a weight loss of 6.33% was noted. The material had set to a hard, tough state and no cracks were observed.

Example 14

There were mixed together 20 grams of diallyl phthalate, 10.1 parts of β-monoallyl itaconate, and .3 part of tertiary butyl perbenzoate. After heating for about 70 hours at 150°, several cracks were observed in the cured polymer, which was hard and brittle. The weight loss of this sample was about 19.23%.

Example 15

There were mixed together 91.7 parts of diallyl phthalate and .9 part of tertiary butyl perbenzoate. After heating for 70 hours at 150° C., excessive cracking and evidence of a highly exothermic reaction were present in the cured polymer. The weight loss of this sample was 6.7%.

The samples of Examples 13 through 15 above were then heat treated at 200° C. for the times shown in Table VI below, the weight losses after the times indicated being as shown in the table.

TABLE VI

| Sample No. | 168 hrs. | 335 hrs. | 503 hrs. |
| --- | --- | --- | --- |
| | Percent | Percent | Percent |
| 13 | 11.29 | 12.35 | 11.30 |
| 14 | 27.95 | 32.17 | 33.88 |
| 15 | 20.4 | 28.07 | 32.0 |

From the above, it is readily apparent that the use of an epoxy resin in conjunction with the β-monoallyl itaconate-diallylphthalate resin is very advantageous. When the ethoxyline resin was used, a firm, hard polymer resulted with relatively low weight loss as compared to Example 14, where no ethoxyline resin was used, and to Example 15, where neither ethoxyline resin nor β-monoallyl itaconate was used.

In addition to vinyl type reactive materials or polyesters which may be used in conjunction with the present invention, vinyl silicone materials have proved to be very useful.

Example 16

There were mixed together 100 parts, by weight, of Epon 828, 30 parts of β-monoallyl itaconate, and 35 parts, by weight, of vinyl trichlorosilane. The mixture reacted immediately at room temperature with the addition of the vinyl trichlorosilane which was added to the other ingredients. There was an evolution of chlorine and the mixture cured in approximately 15 minutes without heating to a semi-flexible foamy mass.

It has also been found that the ethoxyline resin-β-monoallyl itaconate composition of the present invention can be combined advantageously with polyvinylchloride, polyvinylidene chloride resins, and plastisols made from such resins. Generally, the plastisols which are useful in the practice of this invention are those which comprise finely divided dispersions of vinyl halide resins and plasticizers for the vinyl halide resins, including as a dispersed phase highly divided polychlorotrifluoroethylene, polyvinyl chloride, polyvinylidene, etc., finely divided copolymers of vinylchloride and vinylidene chloride, copolymers of vinyl halide, and vinyl esters in which the vinyl ester comprises a major proportion of the total weight of the latter, and the vinyl chloride prior to copolymerization, for instance copolymers of vinyl chloride and vinyl acetate, copolymers of vinyl chloride and vinyl propionate, etc. Preferably the average particle size of the dispersed phase is from about 10 to 100 microns. The dispersing phase or plasticizer for the vinyl halide resin may comprise, in addition to other modifying agents such as stabilizers for the vinyl halide resins, surface active agents, etc., dibutyl phthalate, tricresyl phosphate, dioctyl phthalate, dibutyl sebacate, dinonyl phthalate, di-2-ethylhexyl phthalate, glycerol monostearate, etc. The plasticizer may conveniently comprise from about 20 to 50% by weight of the total weight of the plastisol or plasticizer, and the vinyl halide or similar type resin. In addition to plastisols comprising a vinyl halide resin and a plasticizer, the plastisols may also contain polymerizable ingredients as for instance unsaturated alkyd resins such as diethylene glycol maleate, dipropylene glycol maleate, as well as other copolymerizable liquid compositions having a terminal, polymerizable olefinic linkage, such as styrene, acrylonitrile, diallyl phthalate, methyl methacrylate, etc. Such types of plastisols are more particularly disclosed and claimed in Loritsch et al., Patent 2,567,719 assigned to the same assignee as the present invention. This patent which also includes additional examples of plasticizers for vinyl halide resins as well as various other examples of unsaturated alkyd resins, vinyl halide resins, and copolymerizable ingredients is made by reference a part of the disclosure of this application.

Example 17

A mixture was prepared comprising by weight 100 parts of Epon 828, 30 parts of β-monoallyl itaconate, 70 parts diallyl phthalate, and one part tertiary butyl benzoate. To 100 parts of the above mixture there was added 100 parts of a plastisol comprising by weight 48% of the polyvinyl chloride, 5% polyvinylidene chloride, 15% dioctyl phthalate, and 21% tricresyl phosphate, along with 11% antimony trioxide as a filler. When cured for 24 hours at 175° C., the resultant material was tough, flexible and showed considerable improvement over the plastisol itself toward heat resistance and resistance to cut-through at elevated temperatures. Whereas the plastisol alone becomes quite soft and has little resistance to cut-through at 100° C., the above blend of materials is still tough and resistant to cut-through at 175° C. This material is particularly useful as a potting compound and as a dip coating compound in which structures to be coated are simply dipped. It has been found that for different compositions and end uses, curing times range from about one to 24 hours or more at temperatures of from about 125° C. to 200° C.

The compositions of this invention in general have many applications. For example, they can be used in readily prepared solvent solutions as surface coatings and adhesives, as impregnating agents for paper and other fibrous materials including glass and cloth. These compositions of matter either filled or unfilled are useful as casting resins, filling compounds, surface coatings, electrical insulation, and potting compounds. In addition, they may be used as surface coatings and adhesives for, and in the preparation of, laminated articles, composed of a plurality of sheets.

What I claim as new and desire to secure by Letters Patent of the United States is:

1. A composition of matter comprising (1) a complex epoxide resin obtained by reacting a member of the group consisting of a polyhydric alcohol and a polyhydric phenol with an epihalohydrin, said epoxide resin having more than one epoxy group per molecule, and (2) a curing agent for said epoxide resin comprising β-monoallyl itaconate.

2. A composition of matter obtained by heating to the cured state a mixture of ingredients comprising (1) a complex epoxide resin comprising the reaction product of bis-(4-hydroxy phenol)-2,2-propane, and epichlorohydrin, and (2) β-monoallyl itaconate.

3. A shaped article comprising a heat-cured product of a mixture of ingredients comprising (1) a filler, (2) a complex epoxide resin obtained by reacting a member of the group consisting of a polyhydric alcohol and a polyhydric phenol with an epihalohydrin, said epoxide resin having more than one epoxy group per molecule, and (3) β-monoallyl itaconate.

4. An article of manufacture comprising a laminated product composed of a plurality of sheets coated with a mixture of ingredients comprising (1) a complex epoxy resin obtained by reacting a member of the group consisting of a polyhydric alcohol and a polyhydric phenol with an epihalohydrin, said epoxide resin having more than one epoxy group per molecule, and (2) a curing agent for said epoxy resin comprising β-monoallyl itaconate.

5. The process which comprises (a) preparing a mixture of ingredients comprising (1) a complex epoxide resin obtained by reacting a member of the group consisting of a polyhydric alcohol and a polyhydric phenol with an epihalohydrin, said epoxide resin having more than one epoxy group per molecule, and (2) β-monoallyl itaconate, by admixing, and (b) heating the above mixture for a time and at a temperature to polymerize the ingredients.

6. A composition of matter comprising (1) a complex epoxide resin obtained by reacting a member of the group consisting of a polyhydric alcohol and a polyhydric phenol with an epihalohydrin, said epoxide resin having more than one epoxy group per molecule, (2) diallylphthalate, and (3) β-monoallyl itaconate.

7. A composition of matter comprising (1) a complex epoxide resin obtained by reacting a member of the group consisting of a polyhydric alcohol and a polyhydric phenol with an epihalohydrin, said epoxide resin having more than one epoxy group per molecule, (2) β-monoallyl itaconate, and (3) a plastisol comprising a finely divided halide resin selected from the class consisting of polyvinyl chloride, copolymers of vinyl chloride and vinyl acetate, and copolymers of vinyl chloride and vinylidine chloride dispersed in a liquid plasticizer for the halide resin.

8. A composition of matter comprising (1) a complex epoxide resin obtained by reacting a member of the group consisting of a polyhydric alcohol and a polyhydric phenol with an epihalohydrin, said epoxide resin having more than one epoxy group per molecule, (2) β-monoallyl itaconate, (3) diallyl phthalate, and (4) a plastisol containing a finely divided vinyl halide resin, selected from the class consisting of polyvinyl chloride, copolymers of vinyl chloride and vinyl acetate, and copolymers of vinyl chloride and vinylidine chloride, dispersed in a liquid plasticizer for the vinyl halide resin.

9. A composition of matter comprising (1) a complex epoxide resin obtained by reacting a member of the group consisting of a polyhydric alcohol and a polyhydric phenol with an epihalohydrin, said epoxide resin having more than one epoxy group per molecule, (2) vinyl trichlorosilane, and (3) β-monoallyl itaconate.

10. A composition of matter obtained by heating to the cured state a mixture of ingredients comprising (1) a complex epoxide resin obtained by reacting a member of the group consisting of a polyhydric alcohol and a polyhydric phenol with an epihalohydrin, said epoxide resin having more than one epoxy group per molecule, (2) β-monoallyl itaconate, and (3) curing agents for (1) and (2).

References Cited in the file of this patent
UNITED STATES PATENTS

| | | |
|---|---|---|
| 2,569,920 | Buck | Oct. 2, 1951 |
| 2,611,762 | Luce | Sept. 23, 1952 |
| 2,707,177 | Skiff | Apr. 26, 1955 |
| 2,712,025 | Rehberg et al. | June 28, 1955 |
| 2,848,433 | Eirich | Aug. 19, 1958 |